(12) United States Patent
Russakoff et al.

(10) Patent No.: US 8,989,514 B2
(45) Date of Patent: Mar. 24, 2015

(54) METHOD AND SYSTEM FOR IMAGE ANALYSIS AND INTERPRETATION

(75) Inventors: Daniel Russakoff, Pleasanton, CA (US); Jonathan Oakley, Pleasanton, CA (US)

(73) Assignee: Voxeleron LLC, Pleasanton, CA (US)

( * ) Notice: Subject to any disclaimer, the term of this patent is extended or adjusted under 35 U.S.C. 154(b) by 385 days.

(21) Appl. No.: 13/366,153

(22) Filed: Feb. 3, 2012

(65) Prior Publication Data
US 2012/0201436 A1   Aug. 9, 2012

Related U.S. Application Data

(60) Provisional application No. 61/439,298, filed on Feb. 3, 2011.

(51) Int. Cl.
*G06K 9/38*   (2006.01)
*G06T 3/40*   (2006.01)

(52) U.S. Cl.
CPC .................................. *G06T 3/4053* (2013.01)
USPC ............ 382/272; 382/128; 382/132; 382/190; 382/224; 382/225; 382/264; 382/209; 382/270; 382/274; 382/275

(58) Field of Classification Search
None
See application file for complete search history.

(56) References Cited

U.S. PATENT DOCUMENTS

| | | | | |
|---|---|---|---|---|
| 5,519,789 A * | 5/1996 | Etoh | ............................ | 382/225 |
| 6,226,408 B1 * | 5/2001 | Sirosh | ........................... | 382/224 |
| 6,374,251 B1 * | 4/2002 | Fayyad et al. | ........................ | 1/1 |
| 6,865,509 B1 * | 3/2005 | Hsiung et al. | ................. | 702/182 |
| 6,882,997 B1 * | 4/2005 | Zhang et al. | .................. | 707/737 |
| 7,024,049 B2 * | 4/2006 | Bern et al. | ..................... | 382/254 |
| 7,697,764 B2 * | 4/2010 | Kataoka | ....................... | 382/225 |
| 7,724,962 B2 * | 5/2010 | Zhu et al. | ...................... | 382/225 |
| 7,974,464 B2 * | 7/2011 | Lee et al. | ...................... | 382/155 |
| 2005/0232495 A1 * | 10/2005 | Katoh et al. | ................. | 382/225 |
| 2005/0251347 A1 * | 11/2005 | Perona et al. | ................... | 702/19 |
| 2007/0154096 A1 * | 7/2007 | Cao et al. | ...................... | 382/190 |
| 2007/0211958 A1 * | 9/2007 | Khazen et al. | ................ | 382/274 |

(Continued)

OTHER PUBLICATIONS

Yang, C.Y. et al. Exploiting self-similarities for single frame super-resolution. in: the 10th Asian Conference on Computer Vision, Nov. 8, 2010. See pp. 3-p. 7; figure 1.

(Continued)

*Primary Examiner* — Chan Park
*Assistant Examiner* — Iman K Kholdebarin
(74) *Attorney, Agent, or Firm* — Womble, Carlyle, Sandridge & Rice

(57) ABSTRACT

A method is provided that includes identifying a plurality of data sets, each data set is associated with a distribution model and each data set is associated with an image having a first noise level. The method includes partitioning the data sets into a plurality of groups and generating a best representative estimate for each group, the estimate is associated with a second noise level that is less than the first noise level. The method further includes annotating each group and receiving an input data set. The method includes assigning the input data set to a group and annotating the input data set according to that group's annotation.

19 Claims, 10 Drawing Sheets

(56) References Cited

U.S. PATENT DOCUMENTS

| | | | |
|---|---|---|---|
| 2008/0292194 A1* | 11/2008 | Schmidt et al. | 382/217 |
| 2010/0086224 A1* | 4/2010 | Demirci et al. | 382/238 |
| 2010/0169024 A1* | 7/2010 | Madabhushi et al. | 702/19 |
| 2010/0318467 A1* | 12/2010 | Porter et al. | 705/51 |
| 2010/0329529 A1* | 12/2010 | Feldman et al. | 382/131 |
| 2010/0329557 A1* | 12/2010 | Wang et al. | 382/171 |
| 2011/0142330 A1* | 6/2011 | Min et al. | 382/159 |

OTHER PUBLICATIONS

Glasner, Daniel et al. Super-Resolution from a Single Image in: the 12th IEEE International Conference on Computer Vision. 2009. Sep. 29, 2009. See p. 351-p. 354; figures 3-4.

International Search Report and Written Opinion, PCT/US2012/023879 mailed Aug. 22, 2012.

* cited by examiner

ME THOD AND SYSTEM FOR IMAGE
ANALYSIS AND INTERPRETATION

PRIORITY

The present application claims priority from U.S. Provisional Patent Application No. 61/439,298, filed Feb. 3, 2011, which is incorporated by reference in its entirety for all purposes.

BACKGROUND

The embodiments pertain to a method for increasing the apparent resolution of image data for purposes of analysis or further processing. More particularly, the embodiments pertain to a method for increasing the apparent resolution of n-dimensional images where n is a positive integer.

As imaging becomes more and more ubiquitous and new imaging modalities push the boundaries of what can be sensed quickly and consistently, the task of accurately extracting information from an image becomes that much more important. Often, however, the images themselves are not at a sufficient resolution for useful information to be reliably located or extracted. Super-resolution methods exist to try and improve the native resolution of raw images for easier analysis. The embodiments described below build a model based on existing, repeating patterns in the image or images for the purposes of increasing the apparent resolution or to more readily extract information from the image data.

SUMMARY

The embodiments provide a method and system for increasing the apparent resolution of image data for the purposes or further analysis or further processing or to more accurately extract information from image data. Using the assumption that images have discernible, underlying repeating regular structures, the method builds a multi-modal probabilistic representation of the distribution of these underlying structures. Using this distribution, the relationship between the underlying distributions and their corresponding high-resolution equivalents can be learned and applied to new images for the purposes of increasing the new image's apparent resolution. Furthermore higher order information can be learned and associated with the underlying distributions and then applied to new, unseen data. This method can proceed under two alternative routes, which are referred to as supervised and unsupervised. In the supervised embodiment, the algorithm has access to corresponding high-resolution and low-resolution image pairs for use in supervised learning of the relationship between the modes of the underlying distribution and their high resolution equivalents. In the unsupervised version, the high-resolution equivalents are learned and then constructed directly from the low-resolution data itself. Finally, in both versions, higher-level information such as edge locations, landmark point locations, or other features, as well as semantic labeling and meta-data can be manually or automatically placed on the low-resolution data and, in the process of super-resolution, this information can be correctly inserted into or associated to either the new, higher resolution image or to the original image.

In one aspect of the invention, a method is provided. The method includes identifying a plurality of data sets, each data set of the plurality of data sets is associated with a distribution model and each data set of the plurality of data sets is associated with an image having a first noise level. It should be appreciated that more than one image can be used to generate the data and the data may be preprocessed data or raw data. The method includes partitioning the data sets into a plurality of groups and generating a representative estimate for each group of the plurality of groups, the representative estimate is associated with a second noise level, the second noise level less than the first noise level. The method further includes annotating each representative estimate for each group of the plurality of groups and receiving an input data set. The input data set may be an Optical Coherence Tomography scan in one embodiment. The method includes determining which representative estimate is a closest, or best match, to the input data set and annotating the input data set according to the representative estimate having the closest match, wherein at least one method operation is executed through a processor.

Other aspects and advantages of the embodiments will become apparent from the following detailed description, taken in conjunction with the accompanying drawings, illustrating by way of example the principles of the embodiments.

BRIEF DESCRIPTION OF THE DRAWINGS

The embodiments, together with further advantages thereof, may best be understood by reference to the following description taken in conjunction with the accompanying drawings.

DETAILED DESCRIPTION

The following embodiments describe a system and a method for image analysis and interpretation. It will be obvious, however, to one skilled in the art, that the present invention may be practiced without some or all of the details. In other instances, well known process operations have not been described in detail in order not to unnecessarily obscure the present embodiments.

Super-resolution (SR) methods of image reconstruction facilitate an increase in image resolution. This can allow image data to be up-sampled, zoomed or otherwise enlarged beyond the pixel resolution at which they were sampled without degradation of apparent detail. Broadly speaking, methods of SR can be split into two approaches. These are: classical, multi-image SR; and example-based SR. In the former, multiple lower resolution images of the same scene are acquired and combined to form a high-resolution result. These methods are often ill-posed, computationally expensive, and, of course, require a collection of images. More explicit are the example-based methods, where correspondences between high-resolution and low-resolution images are learned and then applied to new low-resolution images in order to recover their most likely higher resolution representation. These methods tend to be difficult to generalize to new problem domains and are sensitive to image noise and artifacts. The embodiments provide an alternative method for increasing the apparent resolution of image data.

Figure 1:
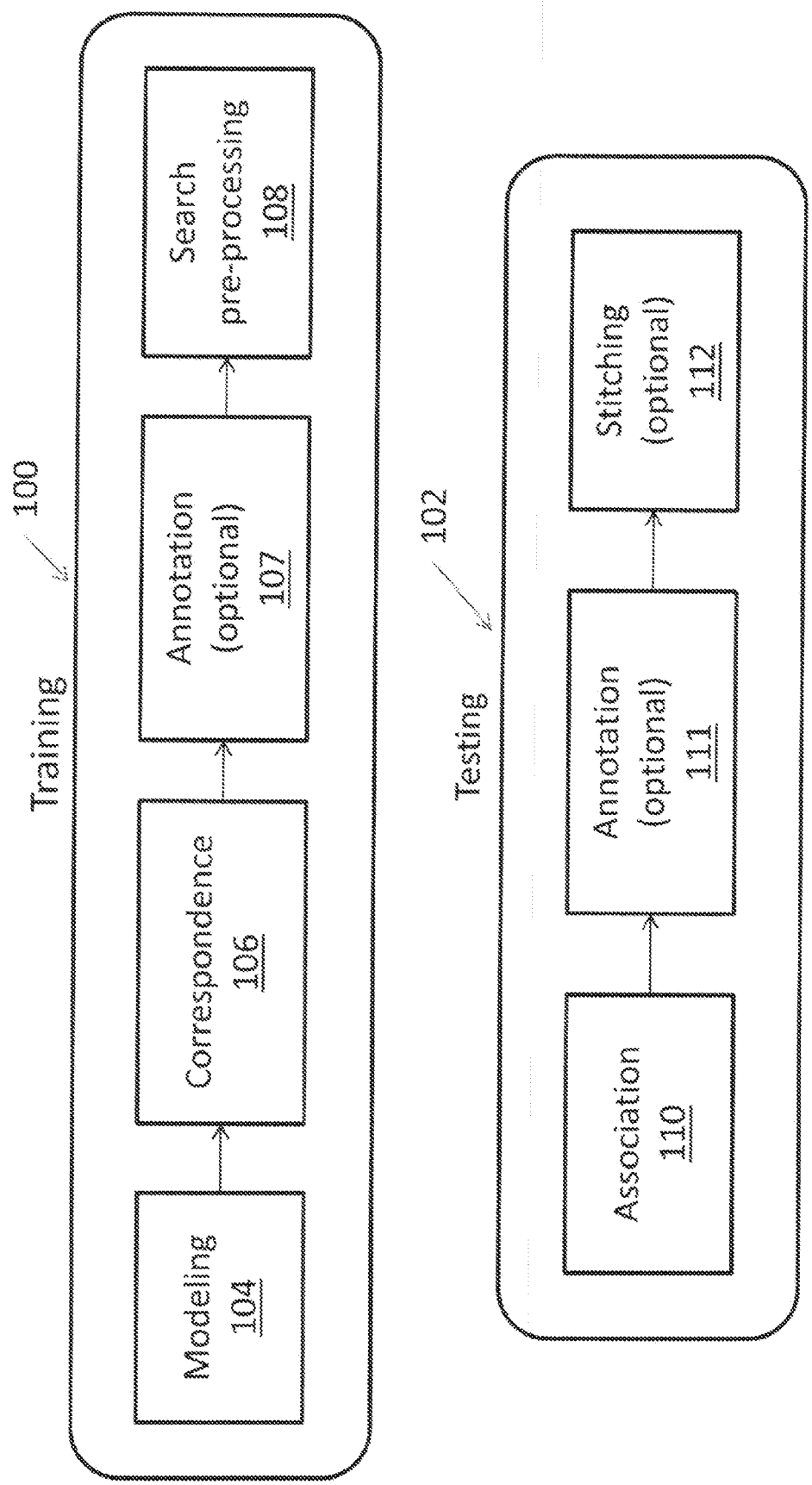
FIG. 1 shows a schematic of the training and testing process in accordance with one embodiment.

As shown in FIG. 1, the embodiments have two principal modes: an offline, training mode 100 and an online, testing mode 102. The training mode 100 occurs before the testing mode 102 in one embodiment. Within the training mode 100, there are two specific embodiments of the algorithm, unsupervised and supervised. Training mode 100 includes modeling module 104, correspondence module 106, an optional annotation module 107, and search pre-processing module 108. In training mode, modeling module 104 involves partitioning the training set into similar subgroups of examples. Next, in the correspondence module 106, a best representative denoised estimate is constructed from each partition. Note that the denoised sample, made from any function applied to any combination of the input samples within the given subgroup, will have a higher apparent resolution. In the optional annotation module 107, higher level knowledge such as edges, regions, landmarks, etc., are manually or automatically associated with each partition. Further details on the annotation feature are provided below. In the search pre-processing module 108, steps can be taken to make searching through the representative samples faster. Such steps could include, but are not limited to construction of a data structure to make fast nearest neighbor queries such as a KD-tree, a binary space partitioning, or a Bounding Volume Hierarchy. Within testing mode 102, new data is associated with the data's best match to the representative denoised samples calculated from the training module. This association, via some similarity or membership function, is achieved through association module 110 and further described with reference to FIG. 3. Having associated the new, low resolution data with their corresponding high resolution representative from the training, an optional step may be executed to associate the annotated metadata which was generated in module 107 with the input dataset in annotation module 111. In one embodiment, annotation module 111 annotates the test data based on the training data. The annotation could include, but is not limited to the annotation of edges, regions, or landmarks onto the new data. Another optional step that stitches these new data together to produce a new image with an apparent higher resolution, is achieved through stitching module 112. Further details for the functionality of stitching module 112 are provided with reference to FIG. 6.

Figure 2:
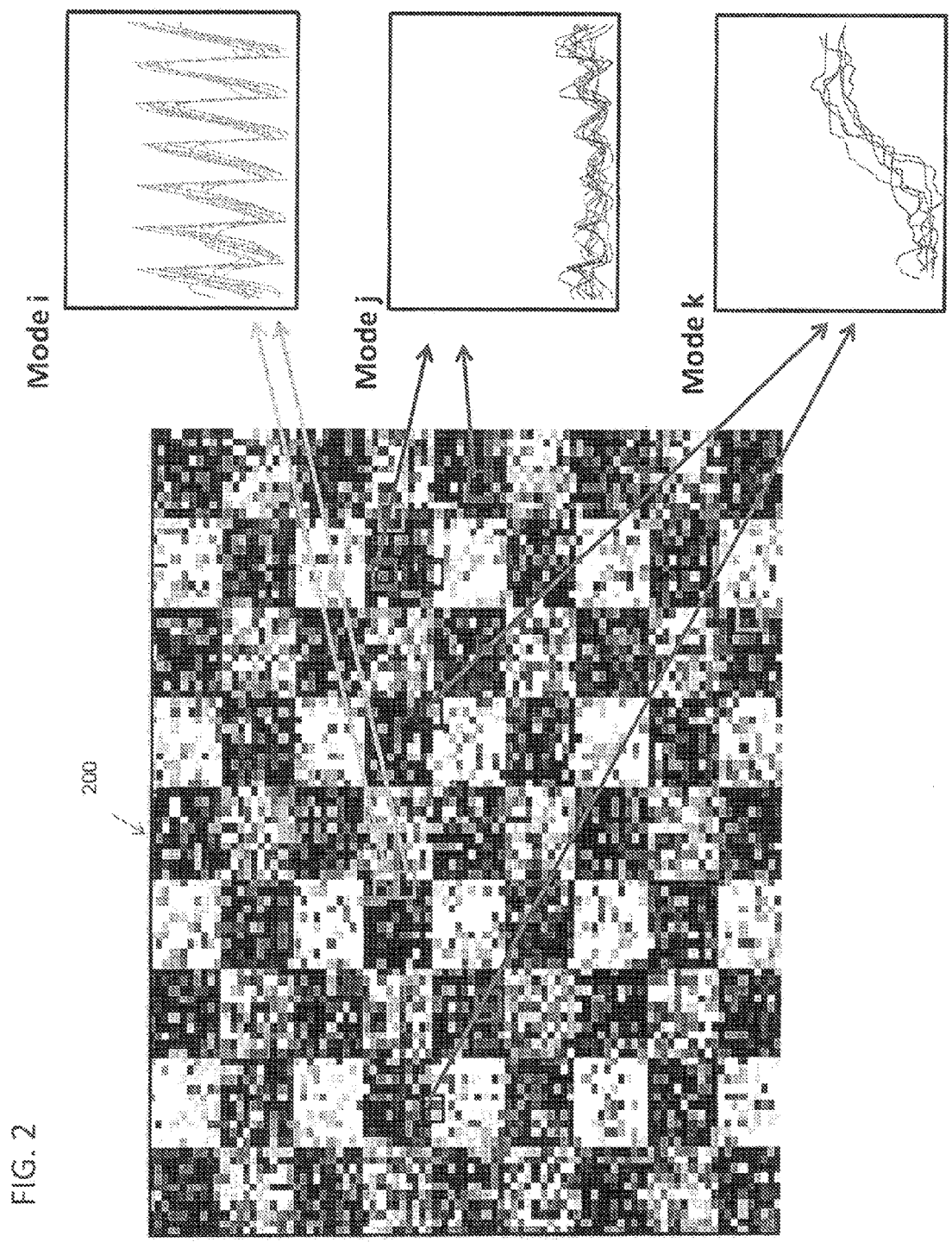
FIG. 2 shows a schematic of the modeling process for the unsupervised technique in accordance with one embodiment.

The unsupervised embodiment begins, as shown in FIG. 2, by first dividing the image up into its component parts. In FIG. 2, the image 200 is two dimensional (2-d) and these parts are overlapping, 2-d patches of the same scale but, in practice, they can be any structured subsets of any n-d image (color or grayscale) data including, but not limited to, multiple-scale 2-d patches of a single 2-d image, single or multiple-scale 2-d patches of multiple 2-d images, single or multiple-scale 3-d sub-cubes of one or more 3-d images, single or multiple-scale 1-d profiles of one or more 3-d images, etc. Regardless of the input image or the structured subsets used, in the next step the image 200 is broken apart and the subsets (mode i, mode j, and mode k) are vectorized into 1-d vectors, as illustrated in FIG. 2. It should be appreciated that if the structured subsets of the images are drawn using multiple scales, each scale can be treated separately. In one embodiment, prior to this step, the image 200 may be preprocessed to clean up the input or enhance specific features using any of a number of possible filters including, but not limited to, smoothing, anisotropic diffusion, median filtering, or denoising. The next step is to approximate the underlying probability distribution which gave rise to these data. This is accomplished with the hierarchical clustering technique illustrated in FIG. 7. In this embodiment, an assumption is made that the modes of the underlying distribution are normally distributed with spherical normals. It should be appreciated that other embodiments may employ alternative distributions probabilistic or otherwise. Any principled way of partitioning the data into a subset of similar groups may be integrated with the embodiments described herein.

Figure 7:
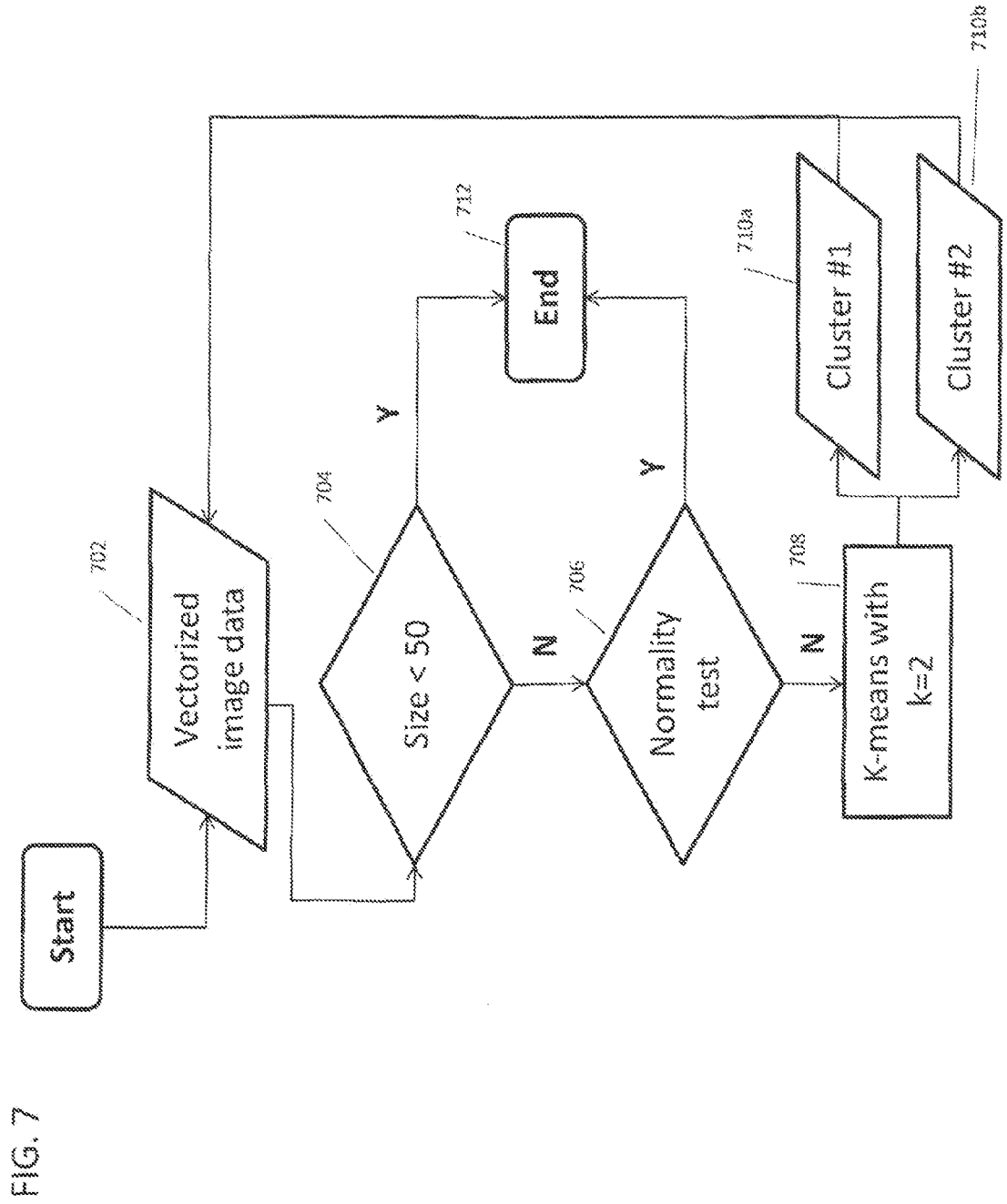
FIG. 7 shows a flowchart schematic of the hierarchical clustering technique in accordance with one embodiment.

Moving to FIG. 7, the hierarchical clustering technique initiates with operation 702 where the image data is vectorized. The process of vectorization involves taking data of any arbitrary dimension and converting that data into a set of 1-d vectors by reordering the data. For example, given a 3-d dataset of dimensionality 512×512×100 with x=512, y=512, and z=100, one way to vectorize is to generate 262,144 1-d vectors with dimension 100, one for each column of voxels associated with x and y. Another way is to break it into 3,276,800 cubes of dimension 2×2×2 which can then be treated as 3,276,800 1-d vectors with dimension 8. It should be appreciated that one or more images can be used to generate the vectorized data for operation 702. The method then advances to operation 704, where it is determined if the number of the remaining unpartitioned data vectors is less than a threshold value, e.g., 50. It should be appreciated that the threshold value of 50 is exemplary and not meant to be limiting. If the size of the data is less than the threshold value of 50 then the method terminates with operation 712, and no further partitioning is performed on that data. If the size of the data is not less than 50, then the method advances to operation 706 where a normality test is applied to the vectorized image data. It should be appreciated that the normality test indicates whether the vectorized image data is drawn from a normal distribution. If the outcome of the normality test is acceptable, i.e., the data is drawn from a normal distribution, this group of data should not be further sub-divided, and the method terminates with operation 712. If the outcome of the normality test is not acceptable, then the method proceeds to operation 708 where further partitioning, via a k-means clustering of the vectorized image data is performed. The outcome of operation 708 is the splitting of the data into a first cluster and a second cluster as illustrated through operation 710a and 710b. The first and second clusters 710a and 710b are then evaluated through the technique of FIG. 7 as described above.

Still referring to FIG. 7, the distribution is thus approximated in this embodiment by hierarchically splitting the data into two clusters and measuring each cluster for normality (i.e. was the data in the cluster drawn from a normal distribution). The splitting is done with a single round of k-means clustering with k=2, but any method of partitioning the data into self-similar clusters will work including, but not limited to, self-organizing maps, QT-clustering, or spectral clustering. In one embodiment, the Henze-Zirkler multivariate normality test is employed; however, any test for multivariate normality could be used. If either cluster is not deemed to be drawn from a normal distribution, then the algorithm recursively calls itself on that cluster. The recursion is broken either when reaching a cluster which is drawn from a normal distribution or when reaching a cluster with a number of elements less than a given threshold. As mentioned above, 50 was used for the threshold in this exemplary embodiment, but this number can be any positive integer and its choice depends on the specific problem domain. It should be appreciated that what results is a collection of clusters, each of which describes a single, multivariate distribution. The collection of all of these distributions represents the underlying probability distribution associated with structured subsets of the input image or images. The clustering step may also be performed with any of a number of existing clustering algorithms including, but not limited to standard k-means clustering, self-organizing maps, QT clustering, and spectral clustering. It should be appreciated that the clustering may also be performed without an underlying probability distribution. For example using k-means clustering with a non-Euclidean distance measure may be employed in one embodiment.

Figure 3:
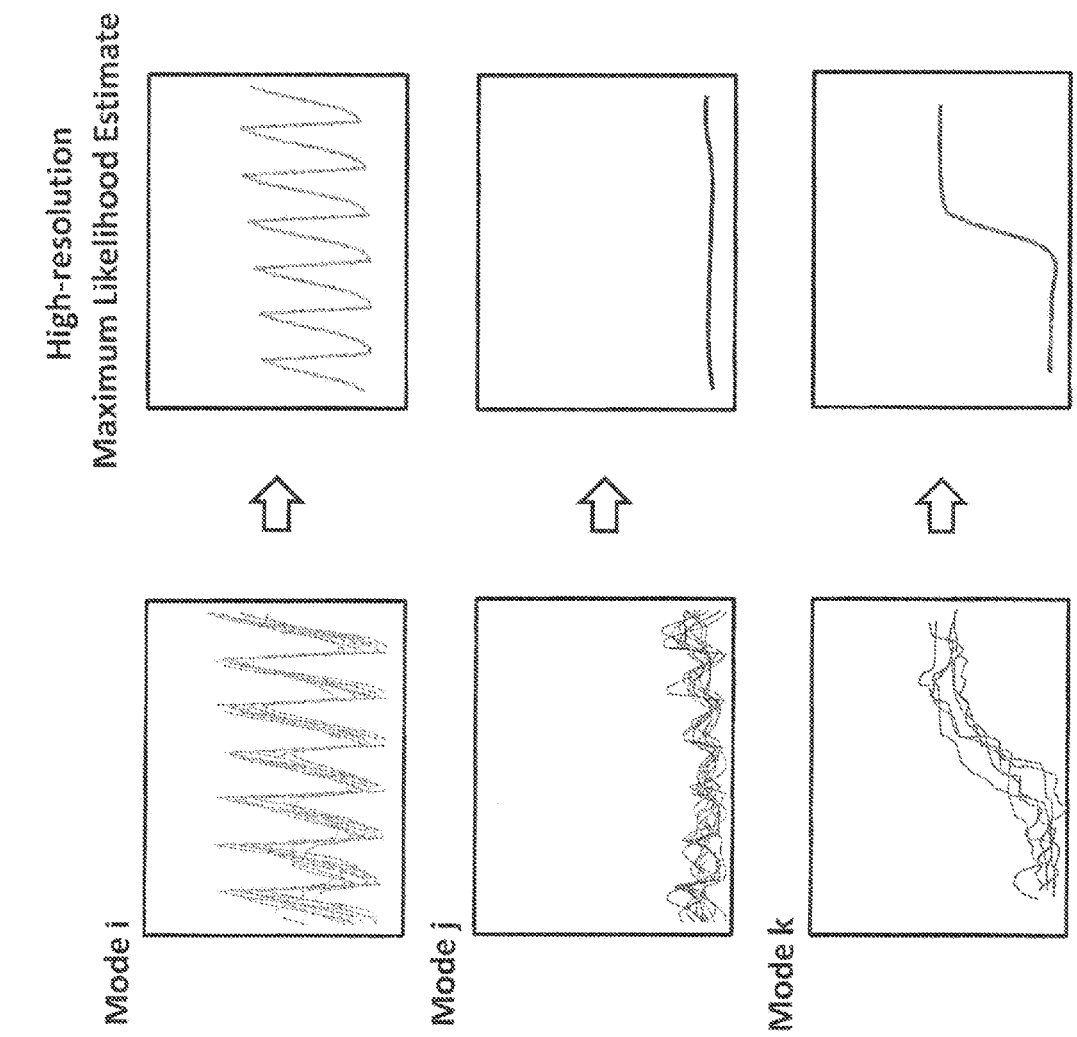
FIG. 3 shows a schematic of the correspondence process for the unsupervised technique in accordance with one embodiment.

The unsupervised embodiment continues with the correspondence of each member of the collection of distributions (mode i, j, and k) from the modeling step with its respective higher-resolution equivalent, as shown in FIG. 3. In this embodiment, the assumption is made that the higher-resolution equivalent for each of the individual distributions (mode i, j, and k) comprising the entire underlying distribution is its maximum likelihood estimate. It should be appreciated that in the case of a normal distribution, this value is congruent with the mean of that distribution. And since, in this embodiment, the underlying distribution was modeled using the clustering step discussed above with reference to FIG. 7 with the assumption of normally distributed clusters, it follows this is a reasonable assumption. It should be appreciated that other distributions would work similarly. It should be further appreciated that the maximum likelihood estimate will be cleaner and less noisy than the individual samples within the cluster, corresponding to a higher apparent resolution. Should additional a priori information be available, then maximum a posteriori estimates may also be used. Also, should the underlying partitioning of the data not represent a probability distribution, any method to aggregate a group of data into a representative sample can be used.

Having associated each mode of the underlying distribution (mode i, j, and k) with its maximum likelihood, high-resolution counterpart, the next step is to build a data structure that will quickly associate any new data vector with its appropriate cluster and, as a result, its appropriate high-resolution analogue. In this embodiment, the underlying distribution is assumed to be a combination of spherical Gaussians with unit variance so a nearest-neighbor classifier in a Euclidean space will work for the search step. As such, the preprocessing involves building a data structure that supports fast nearest-neighbor queries. This includes, but is not limited to, kd-trees, bounding volume hierarchies, and oriented bounding boxes. In the case for more general or non-probabilistic distributions, other distance metrics (e.g. Mahalanobis distance) and search structures would be more applicable.

Figure 4:
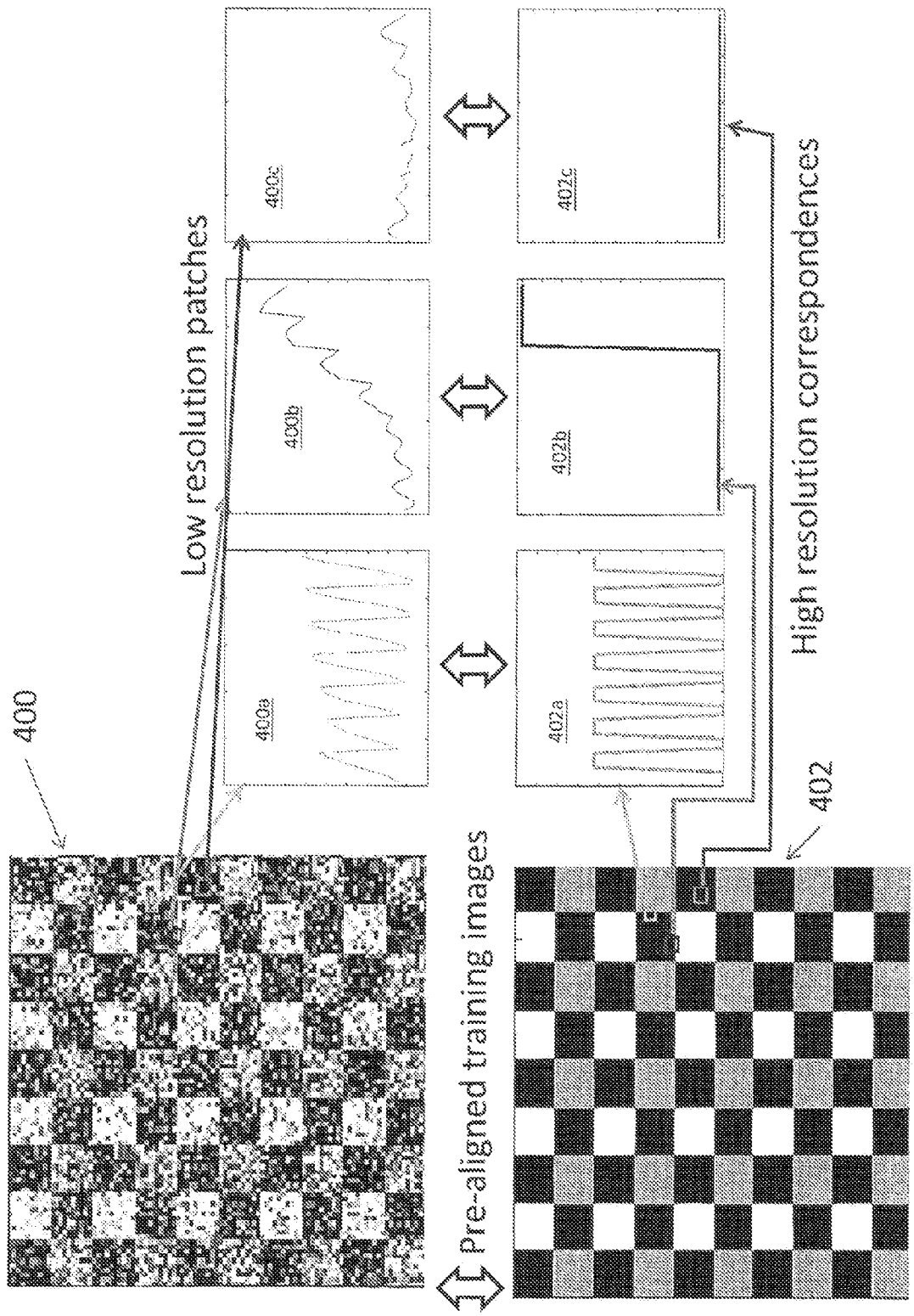
FIG. 4 shows a schematic of the modeling and correspondence processes for the supervised technique in accordance with one embodiment.

The supervised approach is a special case of the unsupervised method. In the supervised approach, there exist corresponding pairs of low-resolution and high-resolution images so that the relationship between the two can be learned directly. In particular, as shown in FIG. 4, the modeling process is a matter of vectorizing the input image 400's structured subsets (here the subsets are n×m image patches which are turned into 1-d vectors of dimension n*m) and associating each associated low-resolution vector with a single mode in the underlying distribution. In this embodiment, the underlying distribution is treated as a collection of singleton modes representing spherical Gaussians with unit variance, one per data vector. As before, this step can proceed after preprocessing the image for the purposes of reducing the input noise.

Similarly, the correspondence problem for the supervised approach is also easier. As suggested by the term "supervised", the correspondences are formed based entirely on the equivalency between the high-resolution image 402 and the low-resolution image 400. This equivalence is achieved by registering the two images (400 and 402) so that they are aligned. If the two images (400 and 402) are already aligned, then the registration step is unnecessary. Each low-resolution patch 400a-c (also referred to as a data subset) is vectorized and associated with its corresponding high-resolution correspondence 402a-c (also referred to as a vectorized subset) on a one-to-one basis, as depicted in FIG. 4. Finally, given the underlying distribution characterized by the set of all singleton modes, a nearest-neighbor search structure is calculated in the same manner discussed with reference to the unsupervised approach.

Figure 5:
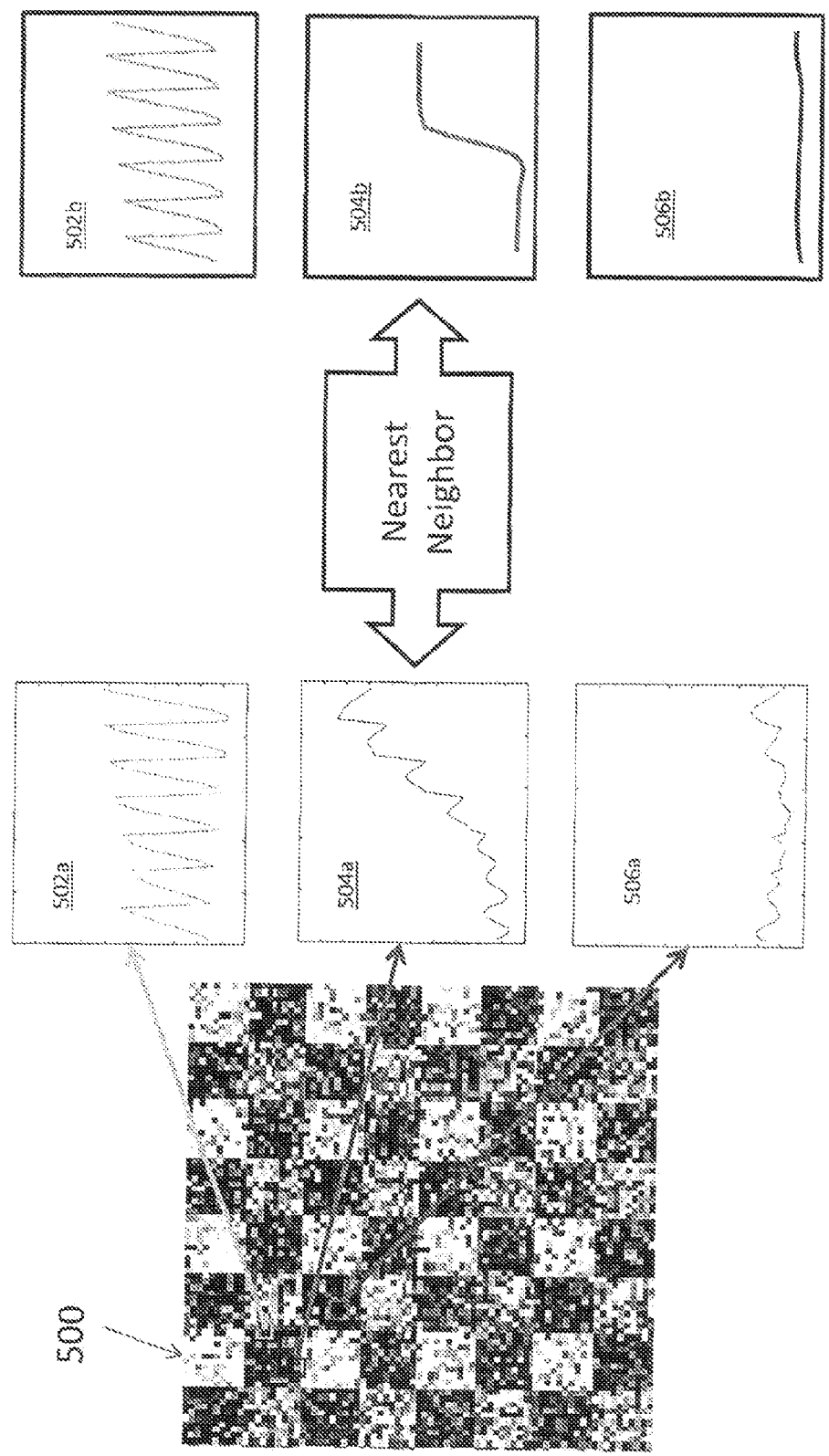
FIG. 5 shows a schematic of the association process in accordance with one embodiment.
Figure 6:
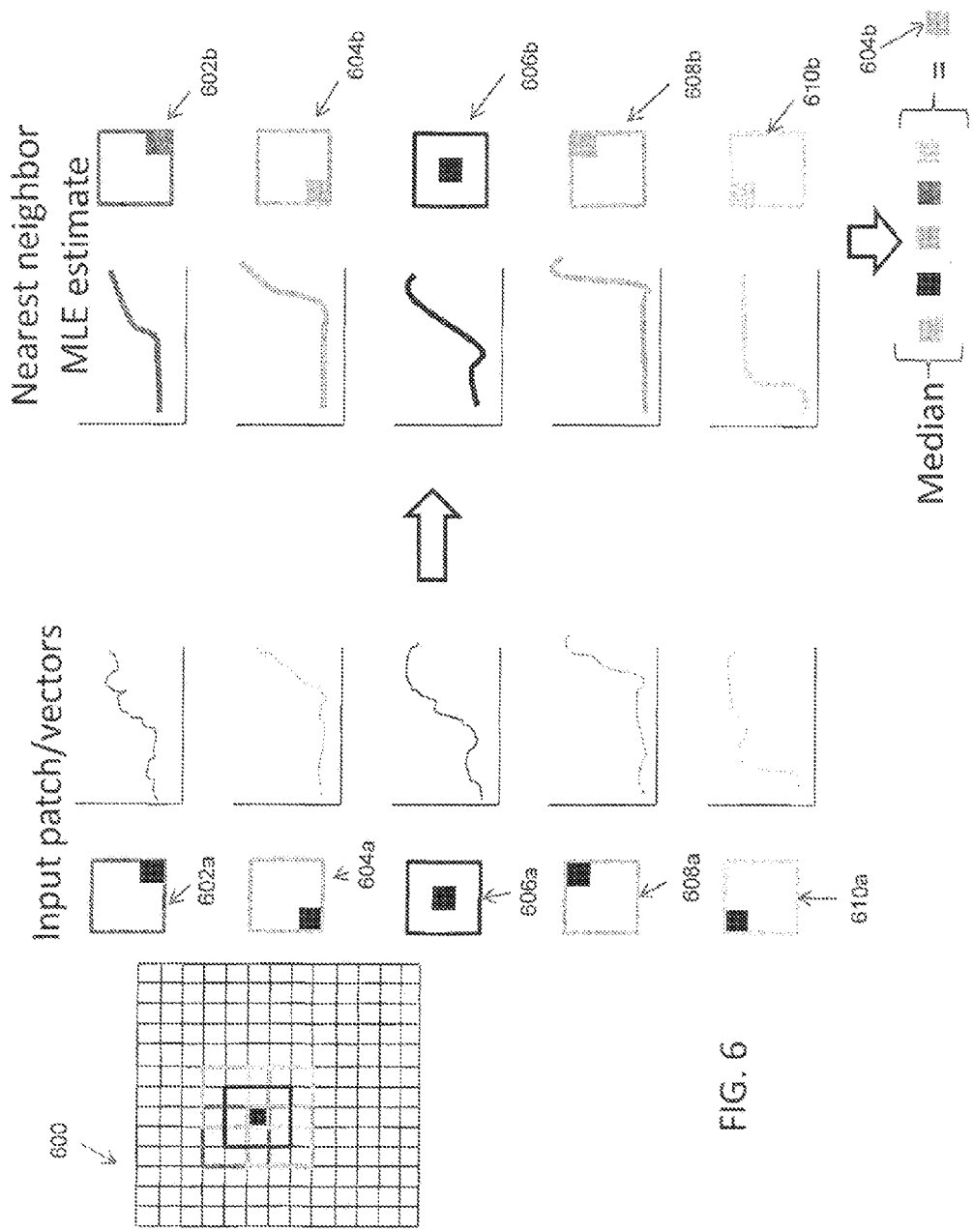
FIG. 6 shows a schematic of the stitching process in accordance with one embodiment.

Having finished the offline training process, referenced in FIG. 1, the online super-resolution processing proceeds in two steps. First, the input lower-resolution image is divided, as in the training procedure, into its component structured subsets. The subsets are vectorized and then must be associated with their most likely mode in the underlying distribution. This step is performed, as depicted in FIGS. 5 and 6, using the fast, nearest-neighbor search made possible by the search structure calculated during the preprocessing in one embodiment. If the underlying distribution does not have a fast search structure then any suitable measure of similarity may be used in alternative embodiments. The suitable measure of similarity is able to associate each input datum with its closest partition where 'close' is determined by whatever similarity measure works best. If the training images were preprocessed in the modeling step, then the input images should also be preprocessed in the same manner. Once associated with its corresponding mode, the subset can further be associated with that mode's high-resolution counterpart. As illustrated in FIG. 5, vectorized subsets 502a, 504a, and 506a that originate from image 500 are associated with its most likely mode 502b, 504b, and 506b, respectively, according to the underlying distribution.

Having associated each structured subset with its high-resolution counterpart as illustrated in FIG. 5, a method for breaking ties is implemented for the situation where the subsets are overlapping. This method is illustrated in FIG. 6 and involves combining all information for a given image location. The exemplary illustration of FIG. 6 depicts input image 600 with 3×3 input patch vectors 602a, 604a, 606a, 608a, and 610a that overlap. At each image location, all subsets that overlap at that location will, through their maximum likelihood, high-resolution estimate, produce a value for that location as illustrated by the nearest neighbor estimate 602b, 604b, 606b, 608b, 610b, and 610b for the corresponding input patch vectors. The job of the stitching algorithm depicted through FIG. 6 is to combine these values to create a new, final estimate. In the current embodiment, the median operator is used for the stitching. That is, the median of the nearest neighbor estimates 602b, 604b, 606b, 608b, 610b, and 610b ids identified and in this exemplary instance is the estimate provided by 604b. Other operators are possible here including, but not limited to, mean, mode, max, min, or even more sophisticated belief propagation methods. In this way, neighborhood consistency is added to the final output.

Figure 9:
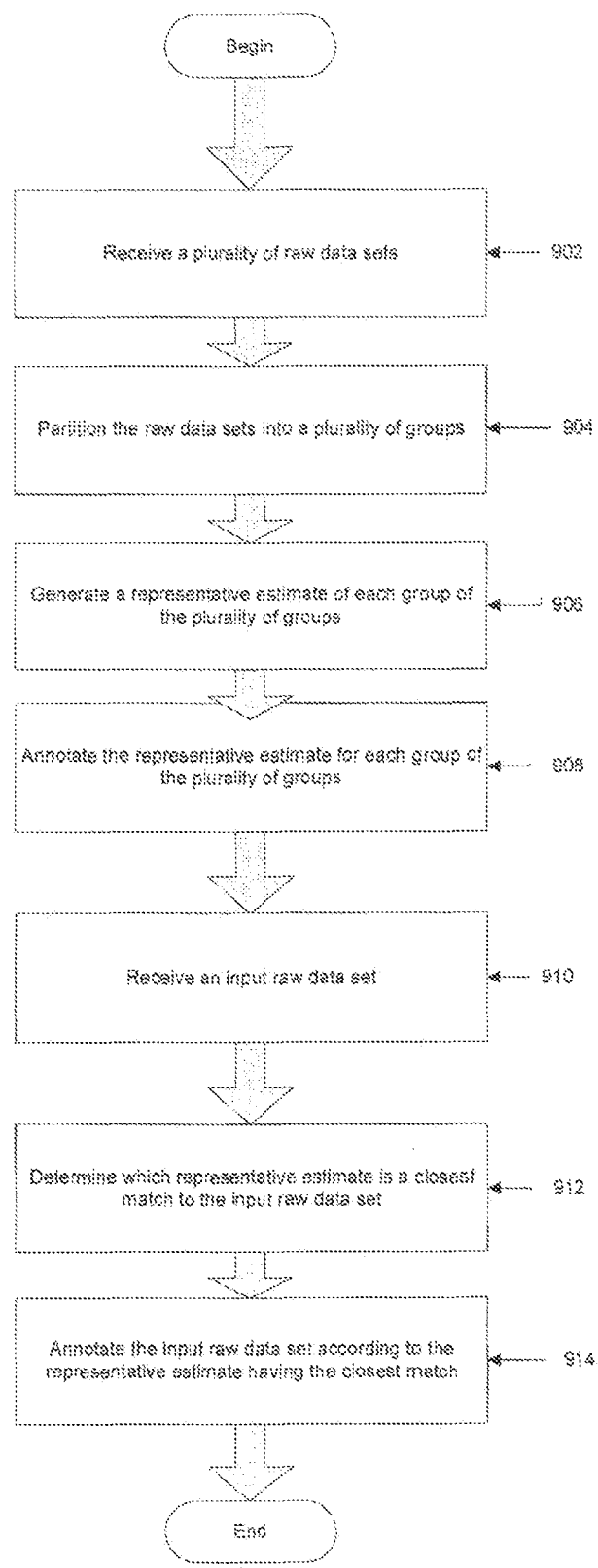
FIG. 9 is a flowchart diagram illustrating method operations for increasing the apparent resolution of image data in accordance with one embodiment

FIG. 9 is a flowchart diagram illustrating method operations for annotating image data with higher level information in accordance with one embodiment. The method initiates with operation 902 where a plurality of raw data sets are received or identified. Each data set of the plurality of raw data sets is associated with a distribution model. In one exemplary embodiment the distribution model is a group of spherical Gaussian distributions. In another embodiment, each data set of the plurality of raw data sets is associated with an image having a first noise level. It should be appreciated that other distribution models probabilistic or not may be integrated with the embodiments described herein. The method then advances to operation 904 where the raw data sets are partitioned into a plurality of groups. In one embodiment, the partitioning feature may include the clustering described with reference to FIG. 7. In another embodiment, a best representative estimate of the true underlying signal is generated for each group of the plurality of groups as described above with reference to FIGS. 2 and 3 based on any or all of the samples. This estimate may exploit the known noise distribution in the input data in order to transform the multiple samples into a single denoised representation. In one embodiment, this best representative estimate has a second noise level that is less than the first noise level. Generating the representative estimate is illustrated in operation 906 and it should be appreciated that operation 906 is optional in one embodiment. The method proceeds to operation 908 where each group of the plurality of groups is annotated. In one embodiment, the best representative estimate for each group of the plurality of groups is annotated. Annotating includes associating higher level information to each partitioning based on a manual inspection of the partition and its representative elements. This might include labeling information in image data, meaning that each assigned label is equally applicable to any future samples that associate to the labeled partition. Examples of higher level information could include, but are not limited to, edges, regions, and landmarks in an image or data signal. It should be appreciated that each annotated representative estimate, as well as each group, may be stored in a data base as described with reference to FIG. 10.

Still referring to FIG. 9, an input raw data set is received in operation 910, e.g., by a computing device. In operation 912, it is determined which group of the plurality of groups is a best or closest match to the input raw data set, via, for example, a similarity measure or membership function. In one embodiment, the best representative estimate is used for comparison for determining the best match. It should be appreciated that numerous techniques may be employed to determine the best match, such as a Euclidean distance, Mahalanobis distance, Manhattan distance, earth mover's distance, mutual information, etc. The method then advances to operation 914 where the input raw data set is annotated according to the annotated information that has been associated to each partition. In one embodiment, the techniques described above are applied with one or more Optical Coherence Tomography (OCT) images.

Figure 10:
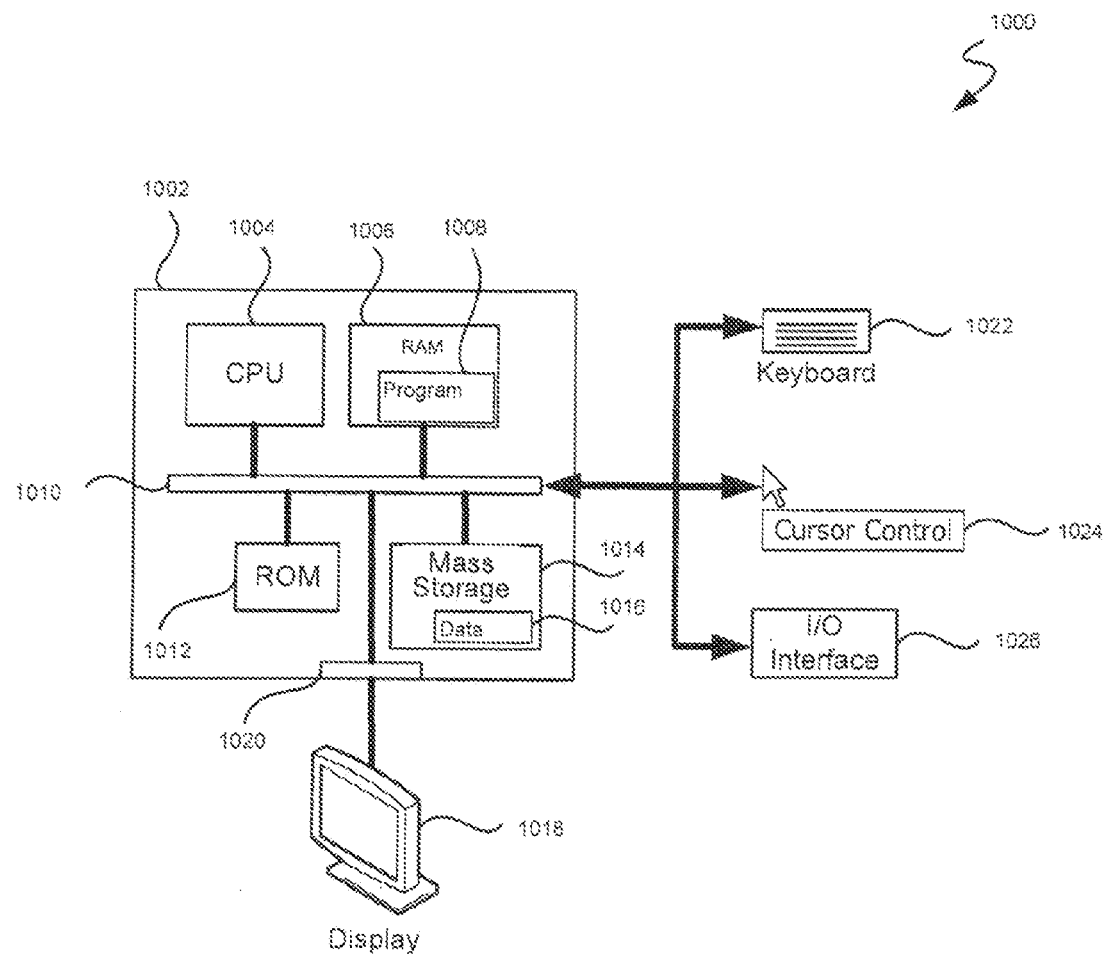
FIG. 10 is a schematic diagram illustrating a system for increasing the apparent resolution of image data in accordance with one embodiment.

FIG. 10 is a schematic diagram illustrating a system for increasing the apparent resolution of image data in accordance with one embodiment. Computer system 1000 may be utilized for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 10 may be used to execute the program instructions described herein. The computer system includes a central processing unit (CPU) 1004, which is coupled through bus 1010 to random access memory (RAM) 1006, read-only memory (ROM) 1012, and mass storage device 1014. Program 1008 resides in random access memory (RAM) 1006, but can also reside in mass storage 1014. It should be appreciated that program 1008 may include the executable instructions represented by the method operations described above.

Mass storage device 1014 represents a persistent data storage device such as a floppy disc drive or a fixed disc drive, which may be local or remote. Data 1016 resides in mass storage device 1014, but can also reside in RAM 1006 during processing. Data 1016 may contain image data, such as the representative estimates for each group, as well as the data for each group. It should be appreciated that CPU 1004 may be embodied in a general-purpose processor, a special purpose processor, or a specially programmed logic device. Display 1018 is in communication with CPU 1004, RAM 1006, ROM 1012, and mass storage device 1014, through bus 1010 and display interface 1020. Keyboard 1022, cursor control 1024, and input/output interface 1026 are coupled to bus 1010 in order to communicate information in command selections to CPU 1004. It should be appreciated that data to and from external devices may be communicated through input output interface 1026.

Figure 8:
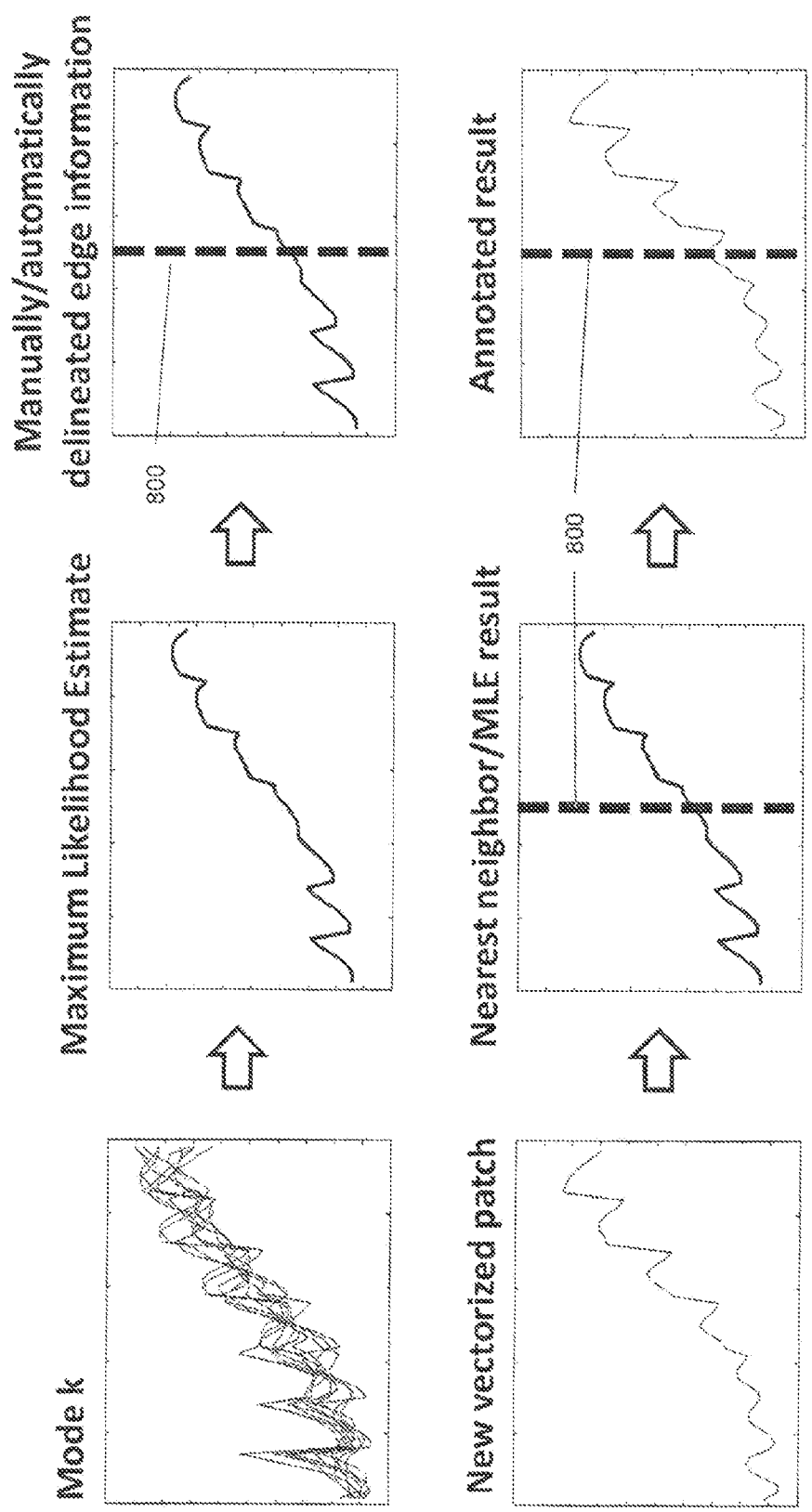
FIG. 8 shows a schematic of the use of domain knowledge in the maximum likelihood estimates to bring new information into the high resolution images.

Another aspect of the embodiments is the ability to insert automatically or manually delineated information into the process. As illustrated in FIGS. 1 and 8, this method allows for the inclusion of higher-level information into the training process. For example, having modeled the underlying distribution of the image patches, as illustrated though mode k in FIG. 8, the maximum likelihood estimates for each of the modes can be annotated with information including, but not limited to, edge locations, specific regions, and landmark point locations, or any other feature that can be identified on the raw data, as illustrated by line 800. Alternatively, semantic labeling and meta-data can be directly associated with the entire partition of training data instead of specifically with the best representative estimate or the maximum likelihood estimate. This information (illustrated as an edge through line 800) can then be transferred to new data using the correspondence between a new data vector and the partition of the training data which best matches this new data as illustrated in FIG. 8. The location of the annotated feature (e.g. line 800) or label in the new data can be found by using the location of the same feature or label associated with the partition of the training data which best matches the input data (see FIG. 8). In this manner, the application of super-resolution can also, at the same time, apply edge detection, landmark detection, classification, labeling or any other higher-level processing that can be applied to the partitions of the training data.

Another aspect of the embodiments is to apply the method in medical applications such as optical coherence tomography where structured matter is imaged. Given, for example, retinal layers in the eye, a given 1-d signal imaged at the retina will depth resolve the retinal layers. Its vectorization via scale and intensity is a very natural implementation given the finitely bounded—between the inner limiting membrane at the anterior and Bruch's membrane at the posterior—and consistently organized layers, in this example, retinal layers. As such, the input signals are ideal for vectorization and replacement with their lower noise (i.e., higher resolution) representations from each one's association in the partitioned data set. This offers aesthetic improvements that may help clinical interpretation. This will facilitate better images, where, for example, opacities in the eye diminished the signal quality at the sensing device. This notion can be extended to other structural anatomical information, such as layers in the skin for dermatological applications with similarly repeating patterns. And indeed to alternative modalities.

An alternative embodiment to the proceeding method also applies in ophthalmic applications where, for example, each 1-d profile through the retina is grouped accordingly to the method set forth. Instead, however, of replacing the profile with a higher resolution alternative, annotated information associated to that partition can be used to interpret the data. Such an annotation can include, but is not limited to, the location of the different tissue layers' interfaces, as assigned by a clinician skilled in the art. This has direct clinical relevance. A manual labeling of the layers can subsequently be automatically applied to any number of input data. Any single grouping of the data in N-d could correspond to any number of N-d vectors, yet would only need to be labeled once. Subsequently, very fast interpretation of vectors—or image patches—could be performed in a very simple and fast way, solely by exploiting the fact that the data is structured in a repeatable manner. This embodiment also has the advantage of implicitly imposing an ordering constraint on the interfaces such that each interface must be located in a fixed order relative to the others, as is exactly the case in the human retina. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network, the data may be processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing exemplary embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of any resulting claims.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method, comprising:
    identifying a plurality of data sets, each data set of the plurality of data sets associated with a distribution model and each data set of the plurality of data sets associated with an image having a first noise level;
    partitioning the data sets into a plurality of groups, the partitioning including clustering the data sets the clustering comprising:
        splitting the data into two subsets using k-means clustering;
        testing each of the two subsets for normality; and
        recursively splitting each non-normal subset into an additional two subsets until either each of the additional two subsets pass the normality test or has fewer members than a predetermined threshold;
    annotating each group of the plurality of groups;
    receiving an input data set;
    determining which group is a closest match to each input data set; and
    annotating the input data set according to the group having the closest match, wherein at least one method operation is executed through a processor.

2. The method of claim 1, further comprising:
    generating a representative estimate for each group of the plurality of groups, the representative estimate associated with a second noise level, the second noise level less than the first noise level, wherein the representative estimate for each group enables efficient association of input data with partitioned groups.

3. The method of claim 2, wherein the representative estimate is a mean of each cluster of the data sets.

4. The method of claim 2, wherein the representative estimate is a median of each cluster of the data sets.

5. The method of claim 1, further comprising:
    vectorizing each data set of the plurality of data sets.

6. The method of claim 1, wherein the annotating comprises:
    identifying interfaces between layers of material.

7. The method of claim 1, wherein the image is an image associated with a tissue reflectivity profile.

8. The method of claim 1, comprising:
storing each annotation for each group of the plurality of groups.

9. The method of claim 2, wherein each representative estimate is generated through a maximum likelihood estimate and wherein each of the program instructions are stored on a computer readable medium.

10. The method of claim 1, wherein the distribution model includes at least two spherical Gaussian distributions.

11. The method of claim 1, wherein the method is utilized within clinical measurements of anatomy.

12. A method, comprising:
identifying a plurality of data sets, each data set of the plurality of data sets associated with a distribution model and each data set of the plurality of data sets associated with an image having a first noise level;
partitioning the data sets into a plurality of groups, the portioning comprising:
splitting the data into two subsets using k-means clustering;
testing each of the two subsets for normality; and
recursively splitting each non-normal subset into an additional two subsets until either each of the additional two subsets pass the normality test or has fewer members than a predetermined threshold;
generating a representative estimate for each group of the plurality of groups, the representative estimate associated with a second noise level, the second noise level less than the first noise level;
receiving an input data set; and
determining which representative estimate is a closest match to the input data set, wherein at least one method operation is executed through a processor.

13. The method of claim 12, further comprising:
replacing the input data set with the representative estimate which is the best match to the input data set.

14. The method of claim 12, further comprising:
annotating each representative estimate for each group of the plurality of groups; and
annotating the input data set according to the representative estimate having the closest match, wherein each annotating operation locates an interface between different tissue layers.

15. The method of claim 12, wherein each representative estimate is generated through a maximum likelihood estimate.

16. The method of claim 12, wherein the distribution model includes at least two spherical Gaussian distributions and wherein each of the program instructions are stored on a computer readable medium.

17. The method of claim 13, wherein a final image is constructed by stitching the representative estimates together using neighborhood information.

18. A system comprising:
a processor; and
a memory coupled to the processor, the memory storing program instructions, the program instructions which when executed by the processor cause the processor to:
identify a plurality of raw data sets, each data set of the plurality of data sets associated with a distribution model and each data set of the plurality of data sets associated with an image having a first noise level;
partition the data sets into a plurality of groups;
split the data sets into two subsets using k-means clustering;
test each of the two subsets for normality; and
recursively split each non-normal subset into an additional two subsets until either each of the additional two subsets pass the normality test or has fewer members than a predetermined threshold;
generate a representative estimate for each group of the plurality of groups, the representative estimate associated with a second noise level, the second noise level less than the first noise level;
receive an input data set; and
determine which representative estimate is a closest match to the input data set.

19. The system of claim 18, wherein the program instructions cause the processor to:
annotate each representative estimate for each group of the plurality of groups; and
annotate the input data set according to the representative estimate having the closest match, wherein each annotating operation locates an interface between different tissue layers.

* * * * *